United States Patent [19]
Greaves et al.

[11] Patent Number: 5,939,516
[45] Date of Patent: Aug. 17, 1999

[54] MODIFIED POLYESTER POLYMERS

[75] Inventors: Sarah Jennifer Greaves, Cleveland; David Anthony Harrison, Harrogate; Kenneth Morgan Jones, Knaresbrough, all of United Kingdom

[73] Assignee: Imperial Chemical Industries PLC, London, United Kingdom

[21] Appl. No.: 08/335,855

[22] PCT Filed: May 12, 1993

[86] PCT No.: PCT/GB93/00970

§ 371 Date: Jan. 12, 1995

§ 102(e) Date: Jan. 12, 1995

[87] PCT Pub. No.: WO93/23449

PCT Pub. Date: Nov. 25, 1993

[30] Foreign Application Priority Data

May 15, 1992 [GB] United Kingdom .................... 9210446
Apr. 1, 1993 [GB] United Kingdom .................... 9306837

[51] Int. Cl.$^6$ .................................................. C08G 63/16
[52] U.S. Cl. ......................... 528/302; 528/272; 528/274; 528/285; 528/286; 528/308; 528/308.6; 264/328.1; 264/328.14; 264/328.18; 264/331.11
[58] Field of Search ..................................... 528/272, 274, 528/285, 286, 302, 308, 308.6; 264/328.1, 328.14, 328.18, 331.11

[56] References Cited

U.S. PATENT DOCUMENTS

| | | | |
|---|---|---|---|
| 4,219,527 | 8/1980 | Edelman et al. | 264/540 |
| 4,234,708 | 11/1980 | Edelman et al. | 525/444 |
| 5,239,045 | 8/1993 | Hirahara et al. | 528/272 |

*Primary Examiner*—Samuel A. Acquah
*Attorney, Agent, or Firm*—Cushman, Darby & Cushman, IP Group of Pillsbury, Madison & Sutro, LLP

[57] ABSTRACT

Modified polyethylene terephthalate polymers, particularly suitable for making carbonated drinks or mineral water bottles by injection (stretch) blow moulding, include a small proportion (from 0.007 to 0.08 mole %) of residues of a polyfunctional hydroxyl compound such as pentaerythritol as a chain branching agent and have (after solid phase polymerisation processing) melt viscosity values of from 300 to 1050 Pa.s (3000 to 10500 Poise) at 295° C. (approximately Intrinsic Viscosity 0.6 to 0.9). The polymers also preferably include from 0.5 to 5 mole % of residues derived from a chain orientation disrupting monomer such as iso-phtalic acid. Best results are obtained in restricted ranges of polymer viscosity, hydroxyl compound and also chain orientation disrupting monomer level. As compared with conventional PET the polymers have the advantage that solid phase polymerisation rates are much improved.

15 Claims, No Drawings

MODIFIED POLYESTER POLYMERS

This invention relates to modified polyethylene terephthalate polymers and copolymers, to a method of making such polymers and copolymers, in particular which enables an improved manufacturing process, to the use of such polymers in the manufacture of bottles and bottle preforms, particularly as made by and in injection blow moulding processes, and to carbonated soft drinks and mineral water bottles and preforms for such bottles made using such polymers.

Polyethylene terephthalate (PET) is made by the condensation polymerisation of a terephthalate material with an ethylene glycol material, with the net elimination of a low molecular weight hydroxylic species. The simplest chemistry is the direct polyesterification reaction between terephthalic acid and ethylene glycol with the elimination of water. Other routes, differing in the detail of the chemistry include those starting from dimethyl terephthalate and ethylene glycol, with the elimination of methanol initially and subsequently ethylene glycol and water or from low molecular weight oligomers compositionally approximating to bis(2-hydroxyethyl) terephthalate with the elimination of ethylene glycol and water. Bis(2-hydroxyethyl) terephthalate is nominally the diester of one mole of terephthalic acid with two moles of ethylene glycol. The material typically used in PET manufacture is made by esterifying terephthalic acid and ethylene glycol at a molar ratio of about 1:1.05 to 1:1.7, typically 1:1.15 to 1:3—and removing from about 1.5 to 2 molar parts of water. This yields a mixture of compounds believed to include mono-esters the true bis(2-hydroxyethyl) terephthalate diester and low molecular weight oligomers. The mean degree of polymerisation (here referring to the number of ethylene terephthalate residues in the oligomer) of the mixture is typically from 2.5 to 5. This oligomer is commonly referred to as bis(2-hydroxyethyl) terephthalate as if it were a true monomer or simply using the term 'monomer'.

Although water may be nominally absent, in fact, it will usually be present as residual moisture in the starting materials or as generated by reactions. Current techniques for the manufacture of high molecular weight polyethylene terephthalate polymers e.g. for use in the manufacture of carbonated drinks (CSD) bottles, carbonated or still mineral water bottles, or highly oriented film products, use a polymerisation method which includes an initial melt phase polymerisation, which usually generates an intermediate polymer, followed by solid phase polymerisation, with the removal of ethylene glycol (mainly) and water (trace). The intermediate polymer is typically mainly glycol ended and has a degree of polymerisation of about 100.

Such two step processes are used because melt phase polymerisation is ultimately diffusion limited and this reduces the rate of removal of the low molecular weight hydroxylic product and thus the molecular weight (usually expressed as polymer viscosity) obtainable, in practice, in the melt. The desired higher molecular weights can be obtained by melt phase polymerisation using extended reaction times, which is economically unattractive, or by using relatively higher reaction temperatures. However, at such high reaction temperatures, side reactions yielding acetaldehyde or other undesirable materials take place more readily and the contaminant products are undesirable, particularly in products intended for food contact applications such as bottles for carbonated drinks. The use of solid phase polymerisation enables the further reaction to be carried out at lower temperatures thus reducing the extent of undesired side reactions.

At the end of melt phase polymerisation, the intermediate polymer is extruded and cut into pellets. As the cooling rates in extrusion are fairly high, the solid pellet product is typically amorphous. The solid phase polymerisation step includes the conversion of the polymer into a crystalline form and continues the polymerisation until the desired, somewhat higher, molecular weight is reached. The rate of solid phase polymerisation is faster at higher temperatures, but the amorphous polymer softens at lower temperatures than the crystalline material and this limits the solid phase polymerisation temperature until the polymer is substantially crystalline. This rate limit can significantly prolong the time needed for solid phase polymerisation and it would be desirable to be able to speed up solid phase polymerisation to improve throughput of polymer in solid phase polymerisation reactors. The polymer product of solid phase polymerisation typically has a degree of polymerisation of about 120.

It is known to include small proportions, typically less than 10 mole % of acid or hydroxyl residues which act to partly disrupt chain orientation of the polyethylene terephthalate polymer chains so as to reduce their tendency to crystallise. This can be of particular importance in making polymer for carbonated drinks or mineral water bottles by the two stage injection blow moulding technique where crystallisation in the injection moulded preform can lead to potential weakness in the subsequently blow moulded bottle. Such polymers are usually simply described as polyethylene terephthalate copolymers in the art. Suitable comonomers and their inclusion in the polymers are described more fully below.

This invention is directed to modified polyethylene terephthalate polymers which can be made by two step process including a particularly rapid solid phase polymerisation step and to the use of such polymers in making bottles and preforms, particularly by injection blow moulding. The modified polyethylene terephthalate polymers of and used in this invention are polyethylene terephthalate copolymers including a minor amount of a further comonomer which gives polyhydroxyl residues in the polymer, thus inducing a small degree of chain branching in the polymer.

It is known to incorporate polyhydroxyl comonomers into poly-ethylene terephthalate. U.S. Pat. No. 4,234,708 A describes the inclusion of from 0.025 to 1.5 mole % of a chain branching agent which can be a polyfunctional hydroxyl or acidic compound, and specified amounts of a chain terminating agent (in proportion to the amount of chain branching agent used) to make polyethylene terephthalate polymers having Intrinsic Viscosity (IV) values greater than 1.0 and superior melt strength to make them suitable for extrusion blow moulding of packages, particularly bottles for low pressure end uses e.g. in non-carbonated drinks bottles. This prior art specification warns that incorporating a chain branching agent into homopolymer polyethylene terephthalate is likely to give rise to opaque portions in the end products and that this problem is solved by using polyethylene terephthalate copolymers as the base polymer material, as well as including chain terminating monomers. We have found that the technique described in this patent can give polymers with improved melt strength. However, incorporating such monomers in polymers having viscosities appropriate for injection moulding, typically melt viscosities in the range 300 to 1050 Pa.s (3000 to 10500 Poise) (approximately corresponding to IV's in the range 0.6 to 0.9, particularly 0.70 to 0.85), the levels of chain branching agent needed to generate useful improved melt strength give a problem of so called unmelts i.e. regions of polymer which are incompletely melted when processed through a conventional extruder. A further problem encountered when polymers having such relatively high levels of chain branching agent are used in the injection moulding is that the polymer is susceptible to induced or stress crystallisation.

The present invention is directed to the use of chain branching agents (borrowing the terminology of U.S. Pat. No. 4,234,708 A) at levels below those generally contemplated by this prior art document and at which no significant enhancement of melt strength is observed. The polymers of and used in this invention have viscosity parameters appropriate to injection moulding applications, particularly as part of the injection blow moulding, especially the injection stretch blow moulding of bottles or for other end uses where the PET polymer is made using a solid phase polymerisation step such as other food contact packaging applications e.g. using extruded PET film or sheet. Although no useful improvement in melt strength is seen at such very low levels of chain branching agent, we have seen significant enhancement of the solid phase polymerisation rate, particularly in polymers intended for subsequent processing into carbonated drinks bottles by injection blow moulding and having IV's typically in the range 0.7 to 0.9, particularly 0.72 to 0.85. The text of U.S. Pat. No. 4,234,708 A does not indicate that any enhancement of solid phase polymerisation rate was observed in that process. There is a theoretical possibility that some enhancement of rate could take place, but the very high viscosities of the final polymer coupled with the inclusion of chain terminating monomers, which tend to slow down solid phase polymerisation, are likely to swamp any rate enhancement.

Accordingly, the present invention provides a modified poly-ethylene terephthalate polymer including from 0.007 to 0.08 mole % of residues derived from a polyhydroxyl chain branching agent, which polymer has a melt viscosity at 295° C. of from 300 to 1050 Pa.s (3000 to 10500 Poise).

The invention is particularly desirably directed to modified polyethylene terephthalate copolymers in which a monomer that disrupts chain orientation is included. Such modified copolymers are particularly useful in the manufacture of carbonated soft drinks and mineral water bottles and preforms for such bottles. Accordingly, the invention includes a modified polyethylene terephthalate copolymer including from 0.007 to 0.08 mole % of residues derived from a polyhydroxyl chain branching agent and from 0.5 to 5 mole % of residues derived from a chain orientation disrupting monomer; which polymer has a melt viscosity at 295° C. of from 300 to 1050 Pa.s (3000 to 10500 Poise).

The invention includes a method of making a modified polyethylene terephthalate copolymer including from 0.007 to 0.08 mole % of residues derived from a polyhydroxyl chain branching agent; and optionally, but desirably, from 0.5 to 5 mole % of residues derived from a chain orientation disrupting monomer; by a two step process in which:

in a first step an intermediate molecular weight polymer is made by melt polymerisation of monomers providing ethylene glycol (—O.CH$_2$.CH$_2$.O—), terephthalate residues (OC.pC$_6$H$_4$.CO) and residues derived from a polyhydroxyl chain branching agent, the intermediate molecular weight polymer optionally further including from 0.5 to 5 mole % of residues derived from a chain disrupting monomer, to give a polymer having a melt viscosity at 295° C. of from 18 to 290 Pa.s (180 to 2900 Poise); and in a second step solid phase polymerising the intermediate molecular weight polymer to give a product having a melt viscosity of from 300 to 1050 Pa.s (3000 to 10500 Poise).

In a particular aspect, the invention includes a method of making a bottle preform, which comprises making a modified polyethylene terephthalate copolymer including from 0.007 to 0.08 mole % of residues derived from a polyhydroxyl chain branching agent; and optionally, but desirably, from 0.5 to 5 mole % of residues derived from a chain orientation disrupting monomer; by a two step process in which:

in a first step an intermediate molecular weight polymer is made by melt polymerisation of monomers providing ethylene glycol (—O.CH$_2$.CH$_2$.O—), terephthalate residues (OC.pC$_6$H$_4$.CO) and residues derived from a polyhydroxyl chain branching agent, the intermediate molecular weight polymer optionally further including from 0.5 to 5 mole % of residues derived from a chain disrupting monomer, to give a polymer having a melt viscosity at 295° C. of from 18 to 290 Pa.s (180 to 2900 Poise); and in a second step solid phase polymerising the intermediate molecular weight polymer to give a product having a melt viscosity of from 300 to 1050 Pa.s (3000 to 10500 Poise).

and injection moulding a bottle preform from this polymer.

In a further aspect, the invention includes a method of making bottles which comprises blow moulding, and in particular stretch blow moulding, a bottle preform made as described above. This method is particularly applicable to the manufacture of bottles for carbonated drinks including reusable (refillable) bottles as generally described in our European Published Patent Application EP 0465040 A, to which reference should be made for more detail and which is incorporated herein by reference, and for carbonated and still mineral water bottles.

Molar percentages of monomers in PET polymers are, in principle, based on the total moles of repeat units of that type (alcohol or acid) in the polymer. However, as the manufacture of PET polymers generally includes the removal of ethylene glycol monomer from an intermediate oligomer and/or polymer, molar percentages are more conveniently calculated on the total molar amount of dicarboxylic acid supplied in the manufacturing process and such figures are used herein.

The modified PET polymer of this invention has a melt viscosity (MV) at 295° C. of from 300 (IV 0.7) to 1050 (IV 0.9) particularly 340 (IV 0.72) to 780 (IV 0.85), Pa.s. For CSD bottles, the polymer viscosity is especially 510 (IV 0.78) to 780 (IV 0.85) Pa.s (5100 to 7800 Poise). For carbonated or still mineral water bottles, the polymer viscosity is especially 340 (IV 0.72) to 510 (IV 0.78) Pa.s (3400 to 5100 Poise).

MV data are those measured on a Daventest Melt Viscometer at 295° C. The shear rate in the polymer in measurements made using this instrument is not fixed and is dependent on the viscosity of the polymer being measured, but is typically in the range 40 to 60 s$^{-1}$. The "IV" figures indicated above in brackets are the approximate intrinsic viscosity figures (for 1% w /v solutions of the polymer in o-chlorophenol at 25° C.) corresponding to the melt viscosity figures as calculated in and given by the Daventest instrument. The conversion is carried out by computation from the melt viscosity data but assumes correspondence of the respective melt and solution figures as for polyethylene terephthalate homopolymer. For polymers containing residues from chain disrupting monomers and chain branching agents the correspondence is likely not to be exact. It is for this reason that we prefer to quote the melt viscosity i.e. the actually measured data, as the appropriate viscosity parameter for the polymers.

The residues derived from a polyhydroxyl chain branching agent are residues of a compound having three or more hydroxyl groups. These residues are typically functionally derived from a polyhydric alcohol such as trimethylol propane, mesoerythritol, dulcitol (galactitol), adonitol (ribitol) or, and particularly beneficially, pentaerythritol. The actual source of residues derived from a polyhydroxyl chain branching agent used in the manufacture of the polymer can be a polyhydric alcohol as such or a derivative of such an alcohol such as an ester (of course provided that the polyhydric alcohol or derivative is suitably thermally stable under the polymerisation conditions). Typical esters are of the polyhydric alcohol with a carboxylic acid. Most simply the acid is monocarboxylic and desirably, the free acid is volatile, typically where it has a low molecular weight e.g. acetic acid, and will tend to be removed from the reaction as vapour. If the free acid is (relatively) involatile e.g. benzoic acid, it will tend to accumulate in the polymer and may act as a chain terminating agent. As is noted below, this is likely to be undesirable, particularly as the presence of chain terminating agents will generally slow down solid phase polymerisation. When ester(s) is(are) used, although monocarboxylic acids give the simplest esters, dicarboxylic esters can be used. In particular, it may be desirable to use an ester of the polyhydric alcohol with terephthalic acid e.g. (nominal) pentaerythritol tetra-terephthalate. In this case, the acid can be incorporated into the polymer chain without acting as a chain terminating agent. Also where the chain disrupting monomer is a di-acid such as iso-phthalic acid (see below), the corresponding ester could be used.

The proportion of residues of chain branching agent incorporated into the polymer is sufficient to yield the improved speed of solid phase polymerisation but not so high as to make the polymer difficult to handle. In this invention, the proportion in the polymer is from 0.007 to 0.08 mole %, corresponding approximately to 0.005 to 0.057 weight % (based on the molecular weight of pentaerythritol= 136 D).

Within this the range of particular amounts used will depend on the properties desired in the product polymer. Thus, for polymer for carbonated soft drinks the proportion of residues of chain branching agent incorporated into the polymer is particularly from 0.007 to 0.045, and especially 0.014 to 0.042, mole %. These ranges correspond approximately to 0.005 to 0.042, particularly from 0.005 to 0.032, and especially from 0.01 to 0.03, weight % (based on the molecular weight of pentaerythritol=136 D). For polymers for making mineral water bottles, the proportion of residues of chain branching agent incorporated into the polymer is particularly from 0.01 to 0.075, and especially 0.02 to 0.06, mole %. These ranges correspond approximately to from 0.007 to 0.053 and particularly from 0.014 to 0.042 weight % (based on the molecular weight of pentaerythritol=136 D).

As some of the chain branching agent may not be incorporated into the polymer, or may be removed from the system as volatile derivatives e.g. during melt phase or solid phase polymerisation, the actual amounts added to the reaction system may need to be somewhat larger than the figures given above to allow for such losses. The use of amounts of chain branching agent less than about 0.007 mole % gives little if any gain in solid phase polymerisation rate and amounts larger than about 0.08 mole % can lead to the generation of unmelts in extruders (whether used in injection moulding or extrusion) or to stress or induced crystallisation in moulding, particularly injection moulding the polymers. The tendency to exhibit stress crystallisation, particularly during practical preform injection moulding, depends on the viscosity of the polymer. Thus, for polymers for CSD bottles, particularly having a viscosity of 510 (IV 0.78) to 780 (IV 0.85) Pa.s (5100 to 7800 Poise), it is desirable that the amount of polyhydroxyl residues is not more than about 0.042 mole % (ca. 0.03 wt %), but for carbonated or still mineral water bottles, particularly having a viscosity of 340 (IV 0.72) to 510 (IV 0.78) Pa.s (3400 to 5100 Poise), higher levels of polyhydroxyl residues up to about 0.06 mole % (ca. 0.043 weight %), e.g. up to about 0.05 mole % (ca. 0.035 weight %), can be used. Within these ranges the general pattern of higher viscosity polymers being more susceptible to induced or stress crystallisation also seems to hold.

Stress or induced crystallisation in moulding can be observed e.g. in injection moulding bottle preforms from polymers incorporating such higher levels of residues of chain branching agent. Crystallisation typically occurs as an annular region or regions of cloudiness, in the main (cylindrical) wall of the preform, indicating crystallisation of the PET polymer. We think this pattern of crystallisation arises because the surfaces of the main wall of the preform are cooled rapidly and remain amorphous and the central part of the interior is not subjected to high shear in moulding, although it cools relatively slowly, and also remains amorphous or mainly so, but there can be a zone between the centre and the outside surface of the preform that cools more slowly than the material adjacent to the wall and is subject to fairly high shear during moulding and crystallisation seems to occur in such zone(s). However, the precise cause of the crystallisation is not entirely certain.

The effect of the crystallisation is that the preform is of little value in making high quality bottles by blow moulding, particularly bottles for carbonated beverages, as the crystallisation will seriously weaken the walls of the bottles so made or cause delamination during blow moulding. In some cases, at high levels of chain branching agent residues, crystallisation of the general body of the preform, especially in the region adjacent the moulding gate, may occur and this also renders the mouldings of little value in further processing.

The polymer also optionally contains a chain orientation disrupting monomer. Such monomers are commonly included in PET polymers, particularly those that are subsequently processed by stretching techniques, for example as in blow moulding, especially injection (stretch) blow moulding, in order to slow down the rate at which the polymer crystallises under the orientation produced by stretching. In the present invention, such monomer(s) are regarded as particularly advantageous and they will usually be included in the polymers of and used in the methods of the invention. The chain orientation disrupting monomer is particularly an aromatic dicarboxylic acid and iso-phthalic acid in particular. It is possible, but not especially preferred to use an alcohol as the chain orientation disrupting monomer and possible such alcohols include 1,4-bis (hydroxymethyl)cyclohexane (more commonly known as cyclohexane dimethanol). When used, the chain orientation disrupting monomer, especially where it is an aromatic dicarboxylic acid, incorporated into the polymer will typically replace from 0.5 to 5, and more usually from 1 to 3, mole % of the terephthalic acid used in the PET polymer. When the chain orientation disrupting monomer is an alcohol, similar proportions will typically be used.

The chain branching agent is incorporated into the polymer as the corresponding residues at least during melt phase polymerisation. This is necessary to enable the major benefit of the use of chain branching agents—the potential to speed up solid phase polymerisation to be realised. It will not be realised unless the chain branching agent is incorporated into the polymer before solid phase polymerisation. The chain branching agent can be added to the polymer reaction system as part of the initial starting monomers or to the mix at intermediate polymerisation stages, particularly at the start of melt phase polymerisation.

The chain branching agent can be added as the neat material, but the relatively very small amounts involved could give rise to uneven distribution in the polymer, particularly if the addition is made in the melt phase polymerisation step i.e. when there is some oligomeric and/or polymeric material present. To avoid this the addition can be made as a solution in a suitable solvent such as water, ethylene glycol, diethylene glycol or a mixture. Alternatively, as is mentioned above in reference to the use of polyol esters as the source, it can be added as a derivative such as an ester, which will have a higher molecular weight and thus added mass (for the same molar amount) presenting less of a problem. The chain branching agent can be added as one of the materials used at the start of polymerisation, at the start or, less preferably, during melt phase polymerisation. Addition during melt phase polymerisation is not particularly preferred as the typical reaction conditions make such addition particularly inconvenient. The general aim is to add the chain branching agent at a stage sufficiently early that the desired residues are incorporated into the polymer by the start of solid phase polymerisation.

When the final polymer is intended for CSD applications, the intermediate polymer at the end of melt phase polymerisation typically has a viscosity of from 80 to 290 Pa.s (800 to 2900 Poise), more usually at least 100 and typically about 120 to 220 Pa.s (1200 to 220 Poise). When the final polymer is intended for mineral water bottle applications, the intermediate polymer at the end of melt phase polymerisation typically has a viscosity of from 18 to 140 Pa.s (180 to 1400 Poise), more usually from 32 to 90 Pa.s (320 to 900 Poise).

The effect of including the residues derived from a polyhydroxyl chain branching agent is to speed up the solid phase polymerisation of the polymer. We have observed time reductions in solid phase polymerisation to achieve typical target viscosities of more than 25%. The speed gain available in any particular case seems to depend on the particular polymer and on the solid phase polymerisation conditions. The gain appears to be real in that molecular weight assessments using gel permeation chromatography indicate that the products of this invention have similar and possibly higher molecular weights than similar polymers made using no chain branching agent, but having the same melt viscosity. This indicates that the viscosities achieved in this invention are not merely an artefact of additional entangling of polymer chains brought about by the chain branching.

In practice, the solid phase polymerisation is typically used to increase the viscosity of the polymer by at least 100 Pa.s (1000 Poise) and more usually at least 200 Pa.s (2000 Poise) or by a factor of at least 1.5 more usually at least 2 and commonly by 4 or more times.

As well as the monomeric units referred to above (including and the nominal monomeric units of oxyethylene and terephthalate of PET), the polymers of the invention can include units of repeated oxyethylene residues generally of the formula:

—O.(CH$_2$.CH$_2$.O)$_n$—

Most commonly such residues will be diethylene glycol residues i.e. with n=2, but some triethylene glycol residues (n=3) may also be present. Such residues are almost invariably present in PET polymers even if the corresponding diols have not been specifically added as reactions to form ether linkages between ethylene glycol molecules or terminal residues compete with the esterification reaction. Typically, the level of such repeated oxyethylene residues in PET polymers, including polymers of this invention, is up to about 7, more commonly 3 to 5 e.g. about 4.5, mole %. In some circumstances e.g. in polymer for refillable bottles as are described in our EP 0465040 A, it can be advantageous to have a definite level of such residues in the polymer and, to this end, starting materials including such residues e.g. the corresponding diols, especially diethylene glycol, can be deliberately added to achieve the desired levels.

Chain terminating agents/residues are sometimes included in PET polymers to control the molecular weight; as described above, this is a particular feature of U.S. Pat. No. 4,234,708 A. Generally, the inclusion of chain terminating residues will, and indeed is intended to, slow down the polymerisation and, as a significant advantage of this invention is to speed up at least the solid phase polymerisation step, is inimical to a benefit of the invention. We have not noted any offsetting advantage from their inclusion (as distinct from the teaching of U.S. Pat. No. 4,234,708 A) and, accordingly, chain terminating residues or their progenitors will not normally be added to the polymer or used in the method of the invention. Desirably, such residues are substantially absent from the present polymer and method.

Apart from the components that are referred to above, other materials and additives can and usually will be used in the method of or incorporated into the polymers of this invention. Such materials include polymerisation catalysts, of which the most common is antimony (III) oxide, Sb$_2$O$_3$, at levels of from 100 to 400, most usually about 250, ppm by weight on the final polymer; phosphoric acid as a stabiliser, at levels of from 75 to 400, usually about 200, ppm by weight on the final polymer; and cobalt (II) salt(s), typically the acetate as colour and clarity improver. For CSD bottle applications the level of cobalt is typically from 100 to 200, usually about 140, ppm and for mineral water bottle applications, because the melt phase polymerisation is usually causes less thermal decomposition in the polymer, the level of cobalt is may be somewhat lower and can be from 50 to 200, usually from about 70 to about 140 for example 80 to 100, ppm by weight on the final polymer (calculated as the acetate salt). Other additives which do not adversely affect the polymer, such as processing aids, fillers, antioxidants, plasticisers and lubricants, pigments and/or dyes can also be included.

Particularly where the polymer is intended for the manufacture of bottles, particularly CSD bottles, especially by injection (stretch) blow moulding using injection moulded preforms which are reheated for (stretch) blow moulding, it can be advantageous to include fine metal particles in the polymer. The inclusion of such fine metal particles speeds up the reheat step, particularly as typically where infra red (IR) heaters, such as quartz infra red lamps, which radiate most intensely in the wavelength range 500 to 2000 nm are used as the heat source. This possibility is described in more detail for otherwise conventional PET polymers in our European Published Patent Application EP 0429311 A, to which reference should be made for more detail and which is incorporated herein by reference.

This invention includes a modified polyethylene terephthalate copolymer, particularly suitable for making carbonated soft drinks bottles, including:

from 0.007 to 0.045 mole %, particularly 0.014 to 0.042, mole % of residues derived from a polyhydroxyl chain branching agent;

optionally, but desirably, from 0.5 to 5 mole % of residues derived from a chain disrupting monomer; and fine metal particles, which intrinsically absorb radiation in the wavelength range 500 nm to 2000 nm, in a quantity such that the reheat time of the polymer is less than the reheat time of the polymer in the absence of that quantity of particles, which polymer has a melt viscosity of from 300 to 1050 Pa.s. The invention also includes bottle preforms made from this polymer by injection moulding, bottles made therefrom and a method of making such bottles by forming preforms from the polymer by injection moulding and subsequently, reheating the preforms using infra red radiation and blow moulding, particularly stretch blow moulding the preforms into bottles.

The metal particles are typically of antimony, tin, copper or a mixtures of these metals. Antimony is particularly useful as it is effective and convenient as antimony particles can be formed in situ in the polymer by reduction of antimony (III) compounds such as the oxide, $Sb_2O_3$, used as a polymerisation catalyst. The particles are desirably sufficiently fine for them not to be visible to the eye and have a range of sizes such that absorption of radiation occurs over a relatively wide part of the wavelength range and not just at one particular wavelength or over a narrow band. The amount used is a balance between the desired reduction in the reheat time of the polymer and the amount of haze that is acceptable for a given application. Typically, the amount will be from 3 to 300, more particularly 5 to 150, especially 10 to 100, ppm by weight on the polymer.

The metal particles may be added to the polymer as finely divided metal particles or, alternatively, the metal may be present in the polymer in the form of a reducible compound of the metal and a suitable reducing agent can be added to the polymer. When a reducible metal compound is used, the quantity of reducing agent used will usually be the appropriate stoichiometric amount, if necessary, with an excess to allow for loses arising from scavenging effects such as interaction of the reducing agent with oxygen dissolved in the polymer. Suitable reducing agents include phosphorus (III) compounds such as phosphorous acid or triphenyl phosphite. Concomitant oxidation of the phosphorous compounds is likely to generate phosphate and this can contribute to the any phosphate included in the polymer as a stabiliser.

Fine metal particles included as described above may act as nucleation sites in the polymer during injection moulding of preforms. Particularly in CSD bottle polymers, which have relatively high viscosities (whether measured as MV or IV) this can be noticeable and the proportion of residues of chain branching agent incorporated into the polymer is thus preferably relatively lower than in polymers which either have lower viscosities or do not include the fine metal particles as is usual in mineral water bottle polymer.

The polymer of the invention finds particular use in the injection blow and especially injection stretch blow moulding of bottles and similar hollow articles. The invention accordingly includes the use of the polymer of the invention in the manufacture of these articles by injection blow and injection stretch blow moulding and the products made thereby.

The following Examples illustrate the invention. All parts and percentages are by weight unless otherwise indicated.

Test and Experimental Methods

Melt Viscosity—was measured using a Daventest Melt Viscometer operating at 295° C. which measures in Poise (conversions into Pa.s are also given) and Intrinsic Viscosity (IV) figures quoted herein are those calculated in the Daventest instrument from the measured melt viscosity data.

Zero Shear melt viscosities—were studied using an extrusion rheometer (at 280° C.) and values for zero shear calculated from the viscosity v shear data produced.

Bottle Preforms—were made using a Negri Bossi 90 single stage preform moulder at a barrel temperature of 280° C.

Note on polymers, chip size and solid phase polymerisation.

The rate of solid phase polymerisation achieved in practice is determined by a variety of factors. These include the ratio of carboxyl to hydroxyl end groups in and the size of the polymer pellets (chips) of the intermediate polymer used and possible changes in concentration of polymerisation catalysts.

In the Examples, the intermediate polymers after melt phase polymerisation had 27 to 45 moles of carboxyl end groups and 70 to 100 moles of hydroxyl end groups per $10^6$ g (tonne) of polymer. The values in particular Examples and corresponding Comparative Examples were similar so that a fair comparison of solid state polymerisation rates could be made.

Catalyst levels were assessed using X-ray fluorescence on the polymers at various stages of the process. This confirmed that the levels of catalyst in the polymer during melt phase polymerisation and in solid state polymerisation within Examples and in respective Comparative Examples were similar. This indicates that changes in solid state polymerisation rate are not artefacts of changes in catalyst concentration.

Chip size is important because the rate of solid phase polymerisation is strongly influenced by diffusion of low molecular weight species (mainly ethylene glycol and water) from the polymer chip into the vapour phase outside the chip. Small chips offer a lower diffusion barrier and a higher surface area per unit mass both tending to give higher solid phase polymerisation rates. The effect of chip size should be taken into account when comparing results from different experiments.

Typically, commercial scale solid phase polymerisation plants are fed with polymer having a chip size of 10 to 20 mg. The experimental melt phase polymerisation equipment used in most of the Examples has a lace extruder and cutter that gives chips having a mean mass of about 50 mg. To enable a closer comparison with practical operation, in some Examples we repelleted the 50 mg chip polymer to give amorphous polymer with a chip size of 15 to 20 mg. In doing this we first crystallised and dried the 50 mg chip polymer before re-extruding and cutting it. Crystallisation was done to avoid agglomeration of the polymer chip in the feed hopper to the (re-)extruder.

EXAMPLE 1

Terephthalic acid (4.15 kg, 25 mol), ethylene glycol (1.9 kg, 31 mol) and NaOH (0.2 g) were placed in a stirred pressure reactor equipped with a heater and a condenser. The reactants were heated with stirring to a temperature of 250° C. under a pressure of 40 psig (ca. 275 kPa gauge). Water was distilled off until about 1.7 molar equivalents based on terephthalic (ca. 750 ml) had been removed.

At this stage the reactor contained about 5.35 kg of a low molecular weight oligomer having a mean degree of polymerisation of about 4. The pressure was reduced to ambient pressure and pentaerythritol (9.6 ml of 5% w/v aqueous solution: 0.48 g, 3.5 mmol, ca. 0.01 weight % and ca. 0.014 mole % on the final polymer); phosphoric acid (10 g of 10% w/v solution in ethylene glycol: ca. 200 ppm by weight on the final polymer) as stabiliser; antimony (III) oxide (12 g of 10% w/v slurry in ethylene glycol: ca. 250 ppm by weight on the final polymer) as polymerisation catalyst; and cobalt (II) acetate (0.7 g) as colour and clarity improver, were added to the oligomer. The vessel was then closed, the pressure reduced to <1 mbar and the temperature raised to 290° C. over about 0.5 hour and the mixture was melt phase polymerised until the melt viscosity of the polymer was 1200 Poise (120 Pa.s) (1 to 2 hours). This intermediate molecular weight polymer (ca. 4.8 kg) was extruded as a lace into a water quenching bath and cut into chips of mean mass from 40 to 50 mg.

The chips of intermediate molecular weight polymer were heated in an oven for about 1 hour at 160° C. to crystallise the polymer. The crystallised chips were then solid phase polymerised in a glass column in a stream of dry nitrogen (401.min$^{-1}$) at 205 to 225° C. until the polymer reached a melt viscosity of 5200 Poise (520 Pa.s). The solid phase polymerisation took about 5 hours.

This polymer was used to make bottle preforms by injection moulding and yielded preforms of excellent clarity and gloss, showing no signs of induced or stress crystallisation. Samples of the preforms were subsequently processed into bottles suitable for packaging carbonated beverages by stretch blow moulding to give high quality products.

Comparative Example 1

Example 1 was repeated except that the pentaerythritol was omitted. Solid phase polymerisation of this polymer took 7 hours to reach the end point viscosity of 5200 Poise 520 Pa.s. This indicates that according to the invention, solid phase polymerisation rate is more than 252 % faster than for otherwise similar but conventional polymers.

EXAMPLE 2

A mixed tere-/iso-phthalate oligomer (77 kg, made using 364 mol phthalic acids) was prepared using the general method described in Example 1 above, but on a correspondingly larger scale and using a mixture of terephthalic acid and iso-phthalic acid in a weight (and mole) ratio of about 96.5 to 3.5 instead of the terephthalic acid alone used in Example 1.

Prior to the melt phase polymerisation pentaerythritol (440 ml of 4% w/v solution in 20/80 by volume ethylene glycol/water mixture: 17.5 g, 129 mmol, ca. 0.025 weight % and ca. 0.035 mole % on the final polymer); phosphoric acid (210 ml of 10% w/v solution in ethylene glycol: ca. 300 ppm by weight on the final polymer) as stabiliser; antimony (III) oxide (175 ml of 10% w/v slurry in ethylene glycol: ca. 250 ppm by weight on the final polymer) as polymerisation catalyst; and cobalt (II) acetate (10 g; ca. 190 ppm by weight on the final polymer) as colour and clarity improver, were added to the 'mixed' oligomer. The mixture was melt polymerised as described in Example 1 until the melt viscosity of the intermediate polymer was 2050 Poise (205 Pa.s) and the polymer was then extruded as a lace into a water quenching bath and cut into chips of mean weight of about 50 mg. The chips of this intermediate molecular weight polymer were loaded into a fluidised bed crystalliser precrystallised, dried and re-extruded as chips of mean weight of 15 to 20 mg (of amorphous polymer). These chips were subsequently crystallised and solid phase polymerised at 200 to 217° C. at a pressure of 1.2 bar in a stream of dry nitrogen (60 m$^3$.hour$^{-1}$) until the melt viscosity of the polymer was 5500 Poise (550 Pa.s) which took about 6 hours.

As with the polymer of Example 1, this polymer was used to make bottle preforms by injection moulding and yielded preforms of excellent clarity and gloss, showing no signs of induced or stress crystallisation. Samples of the preforms were subsequently processed into bottles suitable for packaging carbonated beverages by stretch blow moulding to give high quality products.

Comparative Example 2

Example 2 was repeated except that pentaerythritol (58 g, 426 mmol, ca. 0.1 weight % and ca. 0.14 mole % on the final polymer was added as a solid to the 'mixed' oligomer prior to melt phase polymerisation. The time to reach the target viscosity 2050 Poise (205 Pa.s) was about 20% less than that in Example 2. The intermediate polymer was extruded as a lace into a water quenching bath and cut into chips of mean weight of about 50 mg, precrystallised, dried and re-extruded as chips of mean weight of 15 to 20 mg. Subsequent solid phase polymerisation to a target melt viscosity of 5500 Poise (550 Pa.s) took about 1 hour.

Bottle preforms were injection moulded from this polymer, but the preforms had substantial crystalline regions and were thus not suitable for subsequent processing into bottles with properties adequate for packaging carbonated beverages.

EXAMPLE 3

A 'mixed' oligomer including terephthalic acid and iso-phthalic acid in a molar ratio of 98:2 was prepared from terephthalic acid (59.3 kg, 357 mol), iso-phthalic acid (1.2 kg, 7.2 mol) and ethylene glycol (26.7 kg, 430 mol) as generally described in Example 2, with the removal of water (about 11).

Pentaerythritol (350 ml of 4% w/v solution in 20/80 by volume diethylene glycol/water mixture: 14 g, 103 mmol, ca. 0.02 weight % and ca. 0.028 mole % on the final polymer) also including phosphoric acid (21 g, ca. 300 ppm by weight on the final polymer) as stabiliser: antimony (III) oxide (175 ml of 10 % w/v slurry in ethylene glycol: ca. 250 ppm by weight on the final polymer) as polymerisation catalyst; and cobalt (II) acetate (10 g; ca. 140 ppm by weight on the final polymer) as colour and clarity improver, were added to this monomer. The mixture was melt polymerised as described in Example 1 until the melt viscosity of the intermediate molecular weight polymer was 2000 Poise (200 Pa.s). The polymer was then extruded as a lace into a water quenching bath and cut into chips of amorphous polymer having a mean weight of about 50 mg. These chips were crystallised, and re-extruded and cut to give chips having a mean mass of from 15 to 20 mg.

The chips of this intermediate molecular weight polymer were loaded into a pilot scale fluidised bed reactor fluidised using a stream of dry nitrogen and were heated to 200 to 215° C. using a heating profile to allow polymer crystallisation without causing the chips to stick together. The polymer was solid phase polymerised at 200 to 215° C. until the melt viscosity of the product was 5000 Poise (500 Pa.s), which took about 4 hours.

Samples of this polymer were used to injection mould standard 50 g bottle preforms which were of excellent clarity and gloss and which in turn were stretch blow moulded into good quality bottles.

EXAMPLE 4

Example 3 was repeated except that the amount of pentaerythritol used was 7 g (51.5 mmol, 0.01 weight % and ca.

0.014 mole % on the final polymer) and the iso-phthalic acid was omitted. Test preforms and bottles were made as described in Example 1 and the preforms and bottles had excellent clarity and gloss.

EXAMPLE 5

An intermediate polymer was prepared as described in Example 3 except that the pentaerythritol was added as a solid (21 g ca. 154 mmol; 0.03 % by weight, ca. 0.042 mole % on the final polymer) and the melt phase polymerisation was carried out to a polymer melt viscosity of 2900 Poise (290 Pa.s). The chips were pre-crystallised and dried in a fluidised bed in a stream of dry nitrogen and then re-extruded using a low shear extruder and cut to give chips of 15 to 20 mg mean mass. These polymer chips were then loaded at ambient temperature into a pilot scale fluidised bed reactor fluidised using a stream of dry nitrogen and were heated to 200 to 215° C. using a heating profile to allow polymer crystallisation without causing the chips to stick together. The polymer was solid phase polymerised at 200 to 215° C. until the melt viscosity of the product was 5500 Poise (550 Pa.s), which took about 1 to 2 hours.

The product polymer was moulded into good quality clear preforms which were subsequently stretch blow moulded into good quality clear bottles.

Comparative Example 5

Example 4 was repeated except that the pentaerythritol was omitted. The solid phase polymerisation was carried out on the re-extruded chips at a variety of temperatures in the range 200 to 215° C. The time to give a product melt viscosity of 5500 Poise (550 Pa.s) was from 3 to 7 hours depending on the temperature used with higher temperatures yielding the desired viscosity in reduced times as compared with lower temperatures. The solid phase polymerisation was significantly slower than in Example 4.

EXAMPLE 6

An intermediate polymer was prepared as described in Example 3 except that melt phase polymerisation was stopped at a polymer melt viscosity of 1300 Poise (130 Pa.s). The polymer was extruded and cut to chips 15 to 20 mg mean mass. These chips were solid phase polymerised as described in Example 4 to a product melt viscosity of 5500 Poise (550 Pa.s) taking 5 to 6 hours.

Comparative Example 6

Example 6 was repeated except that the pentaerythritol was omitted. Solid phase polymerisation to a product melt viscosity of 5500 Poise (550 Pa.s) took about 8 hours.

EXAMPLE 7

The melt viscosity v shear properties of the polymers produced in Examples 3, 4 and Comparative Example 5 were studied to assess the respective zero shear properties. The results for each of these polymers lie in the range $10^4$ to $10^5$ Poise ($10^3$ to $10^4$ Pa.s) at 280° C. This indicates that the inclusion of chain branching residues in the polymers of the invention does not measurably enhance the melt strength of the polymers.

EXAMPLE 8

An intermediate polymer was prepared as described in Example 5 with the pentaerythritol added as a solid at a level of 0.035% by weight (ca. 0.049 mole %) on the final polymer except that the melt phase polymerisation was carried out at 285° C. to a polymer melt viscosity of 745 Poise (74.5 Pa.s—IV 0.53). The polymer was extruded and directly cut into chips of mean mass about 15 mg. The polymer chips were solid phase polymerised generally as described in Example 4 but at a temperature of 218° C. until the melt viscosity of the polymer was 3680 Poise (368 Pa.s—0.73 IV), which took approximately 5 hours.

Comparative Example 8

Example 8 was repeated except that the pentaerythritol was omitted. Solid phase polymerisation at 218° C. to the same product melt viscosity took about 7 hours.

We claim:

1. A modified polyethylene terephthalate polymer for making bottles by injection blow molding which has been made by a process which includes a melt phase polymerization step and a subsequent solid phase polymerization step, said polymer comprising from 0.007 to 0.08 mole % of residues derived from a polyhydroxyl chain branching agent which enhanced the polymerization rate in the solid phase polymerization step used in the manufacture of the polymer, having a melt viscosity at 295° C. of from 300 to 1050 Pa.s (3000 to 10500 Poise) and an Intrinsic Viscosity (IV) of from 0.7 to 0.9.

2. A modified terephthalate polymer for making bottles by injection blow molding which has been made by a process which includes a melt phase polymerization step and a subsequent solid phase polymerization step, said polymer comprising from 0.007 to 0.08 mole % of residues derived from a polyhydroxyl chain branching agent which enhanced the polymerization rate in the solid phase polymerization step used in the manufacture of the polymer from 0.5 to 5 mole % of residues derived from a chain orientation disrupting monomer, having a melt viscosity at 295° C. of from 300 to 1050 Pa.s (3000 to 10500 Poise) and an Intrinsic Viscosity (IV) of from 0.7 to 0.9.

3. A modified terephthalate polymer for making bottles by injection blow molding which has been made by a process which includes a melt phase polymerization step and a subsequent solid phase polymerization step, said polymer comprising from 0.007 to 0.08 mole % of residues derived from a polyhydroxyl chain branching agent which enhanced the polymerization rate in the solid phase polymerization step used in the manufacture of the polymer, from 0.5 to 5 mole % of residues derived from a chain orientation disrupting monomers, having a melt viscosity at 295° C. of from 300 to 1050 Pa.s (3000 to 10500 Poise) and an Intrinsic Viscosity (IV) of from 0.7 to 0.9.

4. A polymer as claimed in claim 3 wherein the chain orientation disrupting monomer is an aromatic dicarboxylic acid and replaces from 0.5 to 5 mole % of the terephthalic acid used in the modified polyethylene terephthalate polymer.

5. A polymer as claimed in claim 4 wherein the chain orientation disrupting monomer is iso-phthalic acid.

6. A polymer as claimed in claim 5 wherein the residues of the polyhydroxyl chain branching agent are residues of one or more of trimethylol propane, mesoerythritol, dulcitol (galactitol), adonitol (ribitol) or pentaerythritol.

7. An injection moulded blow mouldable bottle preform made from a modified polymer as claimed in claim 6.

8. An injection blow moulded bottle made from a modified polymer as claimed in claim 6.

9. A modified polyethylene terephthalate polymer as claimed in claim 3, wherein the residues derived from the polyhydroxyl chain branching agent are present in an amount of from 0.014 to 0.042 mole %.

10. A modified polyethylene terephthalate polymer as claimed in claim 9 which has a melt viscosity at 295° C. of from 510 to 780 Pa.s (5100 to 7800 Poise).

11. A modified polyethylene terephthalate polymer for making mineral water bottles by injection blow molding which has been made by a process which includes a melt phase polymerization step and a subsequent solid phase polymerization step, said polymer comprising from 0.01 to 0.075 mole % of residues derived from a polyhydroxyl chain branching agent which enhanced the polymerization rate in the solid phase polymerization step used in the manufacture of the polymer from 0.5 to 5 mole % of residues derived from a chain orientation disrupting monomer, having a melt viscosity at 295° C. of from 300 to 1050 Pa.s (3000 to 10500 Poise) and an Intrinsic Viscosity (IV) of from 0.7 to 0.9.

12. A modified polyethylene terephthalate polymer as claimed in claim 11, wherein the residues derived from the polyhydroxy chain branching agent are present in an amount of from 0.02 to 0.06 mole %.

13. A modified polyethylene terephthalate polymer as claimed in claim 12 which has a melt viscosity at 295° C. of from 340 to 510 Pa.s (3400 to 5100 Poise).

14. A modified polyethylene terephthalate polymer as claimed in claim 11 which additionally comprises fine metal particles, which intrinsically absorb radiation in the wavelength range 500 nm to 2000 nm, in a quantity so that the reheat time of the polymer is less than the reheat time of the polymer in the absence of that quantity of particles.

15. A modified polyethylene terephthalate polymer as claimed in claim 14, wherein the fine metal particles are present in an amount of from 10 to 100 ppm by weight based on the weight of the polymer.

* * * * *